(12) United States Patent
Pfaff

(10) Patent No.: US 7,037,041 B1
(45) Date of Patent: May 2, 2006

(54) PRECAST CONCRETE PIPE RECYCLING MACHINE

(75) Inventor: Deems M. Pfaff, Vail, CO (US)

(73) Assignee: Road Processing Resources, Inc., Vail, CO (US)

( * ) Notice: Subject to any disclaimer, the term of this patent is extended or adjusted under 35 U.S.C. 154(b) by 0 days.

(21) Appl. No.: 11/246,973

(22) Filed: Oct. 7, 2005

Related U.S. Application Data

(60) Provisional application No. 60/617,224, filed on Oct. 8, 2004.

(51) Int. Cl.
*F16L 1/00* (2006.01)

(52) U.S. Cl. ..................... 405/156; 405/184.3; 405/303

(58) Field of Classification Search ............... 405/156, 405/184.3, 303
See application file for complete search history.

(56) References Cited

U.S. PATENT DOCUMENTS 4,979,489 A * 12/1990 Abbasov et al. ............ 405/303
5,127,481 A * 7/1992 Hesse ......................... 405/156
6,280,119 B1 * 8/2001 Ryan et al. .................. 405/156

FOREIGN PATENT DOCUMENTS

JP          10-249225         * 9/1998

* cited by examiner

*Primary Examiner*—Frederick L. Lagman
(74) *Attorney, Agent, or Firm*—Nikolai & Mersereau, P.A.

(57) ABSTRACT

The concrete pipe recycling machine is transportable to job sites for breaking apart concrete pipe and recycling the concrete and the steel reinforcement therein. The concrete pipe recycling machine has a mandrel type anvil which presses the top of the pipe upward toward a hammer which impacts the outside of the pipe such that the energy imparted by the hammer is reflected by the anvil and breaks down the concrete. The concrete aggregate processed by the hammer fall through open mesh with a conveyor thereunder to transport the concrete pieces for recycling. The anvil rotates in gear fashion to rotate the pipe and the hammer traverses axially to reach all portions of the surface of the pipe. The anvil support opens to admit a new pipe to be recycled and to release the steel cage inside of the pipe when the concrete is removed therefrom.

7 Claims, 1 Drawing Sheet

PRECAST CONCRETE PIPE RECYCLING MACHINE

The present application claims benefit to U.S. Provisional Application No. 60/617,224, filed Oct. 08, 2004.

BACKGROUND OF THE INVENTION

1. Field of the Invention

This invention relates to crushing reinforced concrete pipe and recycling the steel and the concrete. It has a significant role in rehabilitating the infrastructure of sewage, drainage and water systems comprising large concrete piping or in pipe manufacturing to recycle faulted product back into material for production.

2. Description of the Related Art

At rehabilitation sites when old sections of sewer pipe or other kinds of precast reinforced concrete pipes were dug up because they had deteriorated and had to be replaced, the old pipe had to be hauled away to be disposed of which was very expensive due to inefficient space utilization when loading pipes on trucks. Sometimes the sections of pipe were hauled to a recycling center for recovering the concrete and the steel reinforcing rods therein and other times the pipes were taken to a landfill. The problem is that pipes do not neatly fit into a landfill without leaving gaps in the landfill, which may collapse causing problems in later years. Further, reinforcing rods may extend out of the concrete causing a hazard in the landfill.

At manufacturing facilities pipe may be manufactured with flaws and must be rejected. The rejected pipes need to be disposed of in the most efficient and environmentally friendly manner possible, such as by recycling the concrete and steel on site to applicable reuse.

There is a need for an economical device to remove the concrete from the reinforcing steel at a job site, or manufacturing facility so that the concrete and the steel can be more efficiently recycled.

SUMMARY OF THE INVENTION

The invention comprises a rotating anvil or mandrel which inserts on the inside diameter of the pipe wall and a hammer which impacts the outside diameter of the pipe wall. The hammer has a foot designed to impact and breakup concrete having reinforcing mesh at various depths. The teeth used on the hammer are specialized for the wall thicknesses. The pipe is rotated by the rotating anvil or mandrel and the hammer breaks off the concrete from the wall of the pipe and the reinforcing steel mesh or rods. The hammer is traversed along the axis of the pipe after each complete rotation of the pipe such that all of the concrete is broken off. Alternatively the pipe may be rotated constantly as the hammer traverses axially along the pipe to provide a spiral impact path on the pipe. The pieces of concrete fall beneath the hammer through a steel reinforcement cage to a conveyor belt which transports processed material outside of the machine. The concrete can then be recycled. The welded steel reinforcing cage can be removed from the mandrel of the concrete pipe recycling machine and cut into sections for hauling to a recycling center. If the unit is processing flawed pipe at a manufacturing facility the cage may be reused if the damage is minor.

OBJECTS OF THE INVENTION

It is an object of the invention to quickly and easily recycle the materials from reinforced concrete pipe.

It is an object of the invention to break concrete pipe into usable aggregate for new concrete and separate the concrete from the steel mesh, cage or rods for recycling the steel.

It is an object of the invention to provide an anvil for the hammer, which will impact efficiently to break the concrete into small pieces.

It is an object of the invention to provide a rotating anvil to rotate the pipe thereon for hammering the pipe in either a spiral or an indexed path to remove the concrete.

It is an object of the invention to provide a transportable concrete pipe recycling machine so that it can be easily hauled to job sites.

Other objects, advantages and novel features of the present invention will become apparent from the following description of the preferred embodiments when considered in conjunction with the accompanying drawings.

DESCRIPTION OF THE PREFERRED EMBODIMENTS

Figure 1:
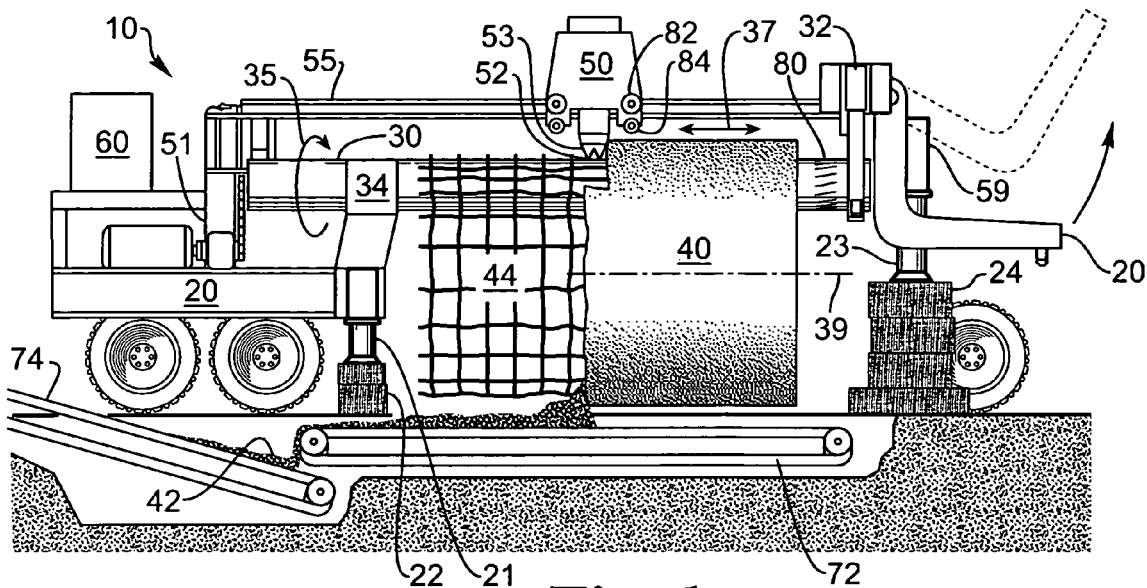
FIG. 1 is a side view of the precast concrete pipe recycling machine.

The principle employed in the precast concrete recycling machine 10 to reduce concrete pipe is the hammer-anvil concept which applies shock plus crushing phenomena. The shock applies initially with minor penetration but sets the pattern of breakup. This is apparent by hairline cracks even beyond the hammer face dimension. Further penetration until end of stroke causes separation of product into desired aggregate sizing and separated concrete from steel reinforcing cages.

The precast concrete recycling machine 10 is transportable on a specialized flatbed trailer 20. The trailer 20 has rear jacks 21 for resting on blocks 22. The trailer also has front jacks 23 for resting on blocks 24 at the front of trailer 20.

A rotating anvil 30 extends between a front support 32 and a rear support 34. The anvil is preferably not much longer than the length of pipe to be recycled since the anvil 30 must be solid and nongiving as possible to reflect the blows of the hammer 50 back through the concrete to help break up the concrete. If the anvil 30 were to yield with each hammer blow it would absorb energy intended for the breaking of the concrete pipe 40.

In the embodiment shown the anvil 30 is round and rotates as shown by arrow 35 to rotate, the precast concrete pipe 40, by gears 51, thus presenting a different portion of the diameter of the pipe to the hammer 50. The pipe 40 may be rotated 360 degrees and then the hammer 50 indexed one hammer foot width into the remaining pipe or the pipe 40 may be constantly rotated and the hammer 50 constantly moved to provide a spiral path of the hammer 50 on the pipe 40. Although in this embodiment the pipe 40 is held and rotated by the anvil 30 at the top of the pipe the mechanism could be inverted wherein the hammer 50 and anvil 30 work at the bottom of the pipe 40. Other means for turning the pipe are possible such as a base, which can rotate the pipe 40 resting on it. Further the anvil could be on the outside of the pipe 40 and the hammer 50 on the inside of the pipe.

Figure 2:
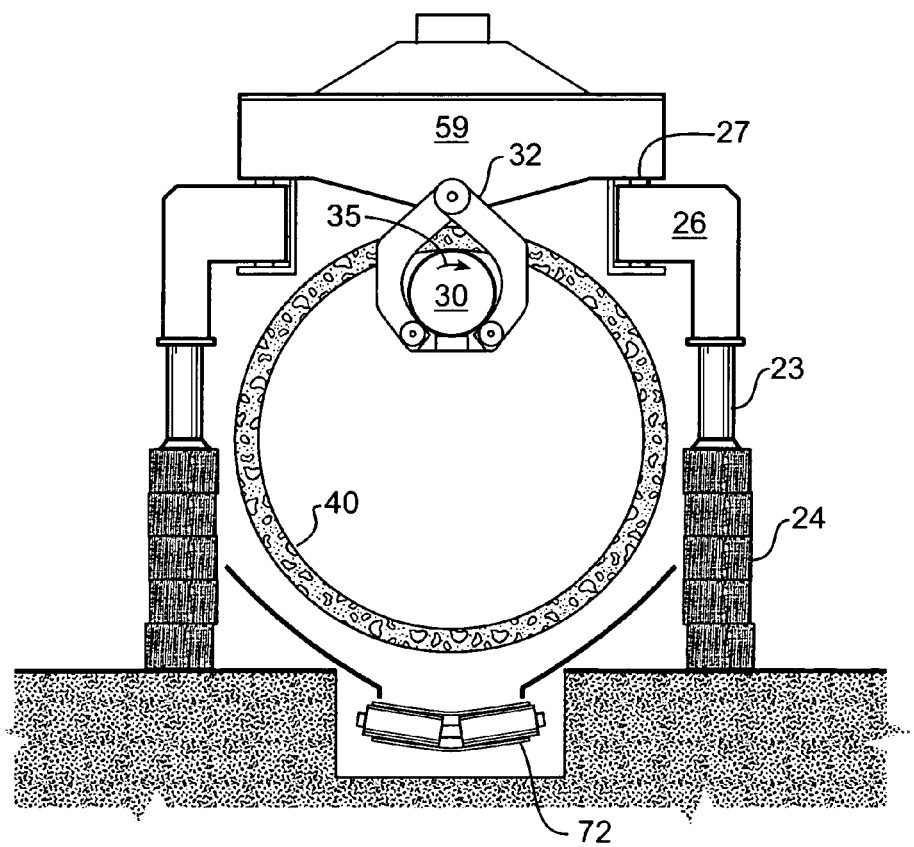
FIG. 2 is an end view of the precast concrete pipe recycling machine.

Referring to FIG. 2, the rotating anvil front support 32 can be a clamshell style support. The support 32 has disengaging means to open up to insert the pipe to be processed. The pipe 40 can be inserted onto the anvil 30 or mandrel by forklift. Likewise the trailer gooseneck 20 has to swing out of lock to allow entry of the pipe to be processed.

The hammer 50 can have different sized feet 52 with different lengths and patterns of teeth 53 thereon for breaking up concrete of different thicknesses and with reinforcing rods at different depths. The hammer 50 is transversable along the axis 39 of the pipe 40 by riding on rails 55. The rails 55 have to hold the hammer 50 steadily such that the blows of the hammer on the concrete do not force the hammer upward during retract and away from the pipe 40 thus absorbing part of the hammer blow in the hammer support rails 55. Wheels 82 and 84 attached to the hammer 50 above and below rail 55 hold the hammer in place vertically. The rails 55 are secured to the frame 59 at either end of the trailer 20.

The hammer 50 may be hydraulically, pneumatically or electrically driven as long as sufficient force is applied to break the concrete pipe 40 into desired aggregate 42. The hammer 50 has a continuous repetitive action.

The teeth 53 of the hammer 50 hit the concrete and first cracks and then breaks up the concrete. The teeth 53 being spaced apart allows space along the surface of the concrete for breaking up the concrete and increasing the shock at the point where the teeth 53 impact the concrete.

The anvil 30 provides a hard backing to reflect the energy from the hammer blows back into the concrete pipe 40 to help fracture the concrete. The anvil 30 is transversable as shown by arrows 37 along the axis of the pipe 40 to admit a pipe between the anvil 30 and the hammer 50 and for taking the steel reinforcing rods 44 out when the concrete is removed.

A power unit 60 provides power for rotating the anvil 30 and for driving the hammer 50 and transversing it. The anvil 30 has a tread 80 to contact the pipe so as to match the rotation by gear activation.

When the concrete is broken off of the pipe 40 it falls below through the open steel mesh or rods 44 then to a conveyor belt 72 below which transports the pieces of concrete 42 to a second conveyor belt 74 for lifting the concrete 42 to a truck or for creating a stock pile.

As shown in FIG. 2 a shoulder 26, which is rotated on pivot 27 on frame 59, is used to swing the jack 23 out from the trailer 20 to give the pipe recycling machine 10 a more stable base to operate on.

Obviously, many modifications and variations of the present invention are possible in light of the above teachings. It is therefore to be understood that, within the scope of the appended claims, the invention may be practiced otherwise than as specifically described.

What is claimed is:

1. A precast concrete pipe recycling machine comprising:
   a cylindrical anvil having a first support and a second support,
   the first support rotates the cylindrical anvil and translates the cylindrical anvil along its axis,
   the second support rotatingly supports the cylindrical anvil,
   a rail aligned axially with the cylindrical anvil,
   a hammer traversing the rail proximate the anvil, such that with the cylindrial anvil supporting the precast concrete pipe on the inside diameter thereof and the hammer impacting the precast concrete pipe on the outside diameter thereof, with the anvil reflecting the impact which contributes to the breaking up of the concrete.

2. A precast concrete pipe recycling machine as in claim 1 wherein,
   a conveyor under the precast concrete pipe, transports the concrete after it is broken off of the concrete pipe and falls on the conveyor.

3. A precast concrete pipe recycling machine as in claim 1 wherein,
   the first support and the second support are mounted on a trailer having rear jacks for supporting the rear of the trailer laterally on each side of the precase concrete pipe and front jacks for supporting the front of the trailer laterally on each side of the precase concrete pipe.

4. A precast concrete pipe recycling machine as in claim 1 wherein,
   the cylindrical anvil rotates to rotate the precast concrete pipe in conjunction with the hammer impacts and the hammer translates along the rail to translate along the axis of the precast concrete pipe such that the hammer impacts and breaks up the entire precast concrete pipe.

5. A precast concrete pipe recycling machine as in claim 4 wherein,
   the cylindrical anvil has a tread on its surface for engaging and moving the precast concrete pipe.

6. A precast concrete pipe recycling machine as in claim 1 wherein,
   the second support comprises a clam shell support which disengages from the cylindrical anvil to allow access for a precast concrete pipe to be inserted on the cylindrical anvil and to allow access for removal of a steel cage after the concrete is removed from the precast concrete pipe.

7. A precast concrete pipe recycling machine as in claim 2 wherein,
   a trailer hitch on the trailer swings upward on a hinge above the rails to allow access for a precast concrete pipe to be inserted on the cylindrical anvil and to allow access for removal of a steel cage after the concrete is removed from the precast concrete pipe.

* * * * *